United States Patent [19]

Gubash

[11] Patent Number: 4,703,577

[45] Date of Patent: Nov. 3, 1987

[54] BUOYANCY DEVICE FOR COLLAPSIBLE MESH FISH BASKET

[76] Inventor: Peter J. Gubash, 903 N. Dale St., St. Paul, Minn. 55103

[21] Appl. No.: 896,634

[22] Filed: Aug. 15, 1986

[51] Int. Cl.$^4$ ............................................. A01K 71/00
[52] U.S. Cl. .......................................... 43/7; 43/54.1
[58] Field of Search ..................... 43/54.1, 55, 56, 7; 441/133, 134; 114/267

[56] References Cited

U.S. PATENT DOCUMENTS

| | | | |
|---|---|---|---|
| 2,241,314 | 5/1941 | Mohler | 43/55 |
| 3,381,408 | 5/1968 | Nishimura | 43/55 |
| 3,478,463 | 11/1969 | Ruter | 43/55 |
| 3,919,803 | 11/1975 | Manguso | 43/55 |
| 4,251,943 | 2/1981 | Sawlsville | 43/55 |

FOREIGN PATENT DOCUMENTS

| | | | |
|---|---|---|---|
| 1097070 | 3/1981 | Canada | 43/7 |
| 6813551 | 3/1970 | Netherlands | 43/7 |

Primary Examiner—Nicholas P. Godici
Assistant Examiner—Karen Skillman

[57] ABSTRACT

A length of buoyant material is coiled around the outside of a mesh fish basket to provide a floatation collar for the basket.

7 Claims, 8 Drawing Figures

BUOYANCY DEVICE FOR COLLAPSIBLE MESH FISH BASKET

FIELD OF THE INVENTION

This invention relates in general to fishing accessories and in particular to mesh collapsible baskets or nets for holding and constraining fish in water after they have been caught.

DESCRIPTION OF THE PRIOR ART

Nets or baskets made of a mesh material are commonly used by fishermen to keep the fish that are caught immersed in water. Generally the basket or net material is a metal mesh which allows the water to flow through freely. A suitable fabric or twine can also be used. The basket is closed at the bottom and open at the top. A handle is usually provided at the top for the fisherman to hold or for attaching the net in some fashion to a boat or dock. Some baskets are made of just the mesh material alone, some have a wire ring or band around the top opening and possibly a medial located ring or band located a distance below the opening and some have an additional ring near the bottom. Some nets have a hinged disk or trap door at the medial band which is opened to place the fish into the basket and automatically closes to keep the fish from jumping out. If the net should slip out of the grasp of the fisherman or break loose from its attachment to the boat or dock, the metal mesh net will sink quite quickly. The fabric or twine type may float but if there are fish in the basket, then it would likely be dragged down into the water quite quickly. To remedy this, floatation collars for the fishing nets or baskets have been developed. Typical is the device shown in U.S. Pat. No. 3,919,803 by Manguso in which a ring of buoyant material is placed around the top opening of the net and the mesh is draped over the ring and secured thereto in some fashion. Another device is illustrated in U.S. Pat. No. 3,381,408 by Nishimura in which a buoyant disk is used as the trap door at the medial ring to keep the basket afloat. Still another floating fish basket is illustrated in U.S. Pat. No. 3,524,278 by Wolfe which similarly has a medially located buoyant closure. The Mohler U.S. Pat. No. 2,241,314 and Ruter U.S. Pat. No. 3,478,463 both utilize a buoyant ring attached around the upper opening of the fish net or basket to keep it afloat. Yet another device is illustrated in U.S. Pat. No. 4,570,374 by Baxley which utilizes a cylindrical buoyant housing member which is attached to and extends upward from the top opening of the fishing net.

In the case of the buoyant rings around the opening, used in some of the prior art devices, if the basket should break loose it may float but the top edge would still be very close to the water level and possibly, especially if it contains a number of fish, could be dragged down below the level of the water and be difficult to spot or retrieve. The same is true where the buoyant device is at a medial location since the upper part of the net will still collapse so the similar problem could occur with a net of this nature should it break loose and float away. Also, in these cases, depending on the load of fish in the basket, the single ring or disk may not be buoyant enough to keep the basket afloat so that it can be spotted by the fisherman and retrieved. In the case of the cylindrical housing at the top of the net, the net could unsnap or unhook even partially from the housing without being observed and the fish could escape from the container.

A further drawback in all of the prior art devices is that for each size or shape of fishing net or basket, a different sized collar or housing or trap door or disk or the like has to be provided. In other words, a large opening fish net will have to have a larger diameter float ring or disk than a fish net with a smaller opening.

SUMMARY OF THE INVENTION

The instant invention provides a length of buoyant material which is coiled around the outside of the fishing net or basket from about the top opening or just below to form a floatation collar of any desired height or width. The ends of the coiled strip of material are removably attached to the net or basket. In this fashion, the size or shape of the fishing net or basket is of little concern since the length or strip of buoyant material can be wrapped around a conventional basket of virtually any size or shape. Further, the amount of buoyancy for the size of basket and possible load of fish can be selected by making the coil only a few turns or many turns, as desired. The coil around the outside of the fishing net then forms a neck which, if the net should break loose or fall from the grasp of the fisherman, will then extend substantially above the water surface so it will be easy to locate and retrieve. Furthermore, as an added feature, the buoyant material is brightly colored so that it makes it easier to see.

Preferably a wire-like tie is provided at each end of the strip of material to provide the means for attaching the strip to the net.

DESCRIPTION OF THE PREFERRED EMBODIMENTS

Figure 1:
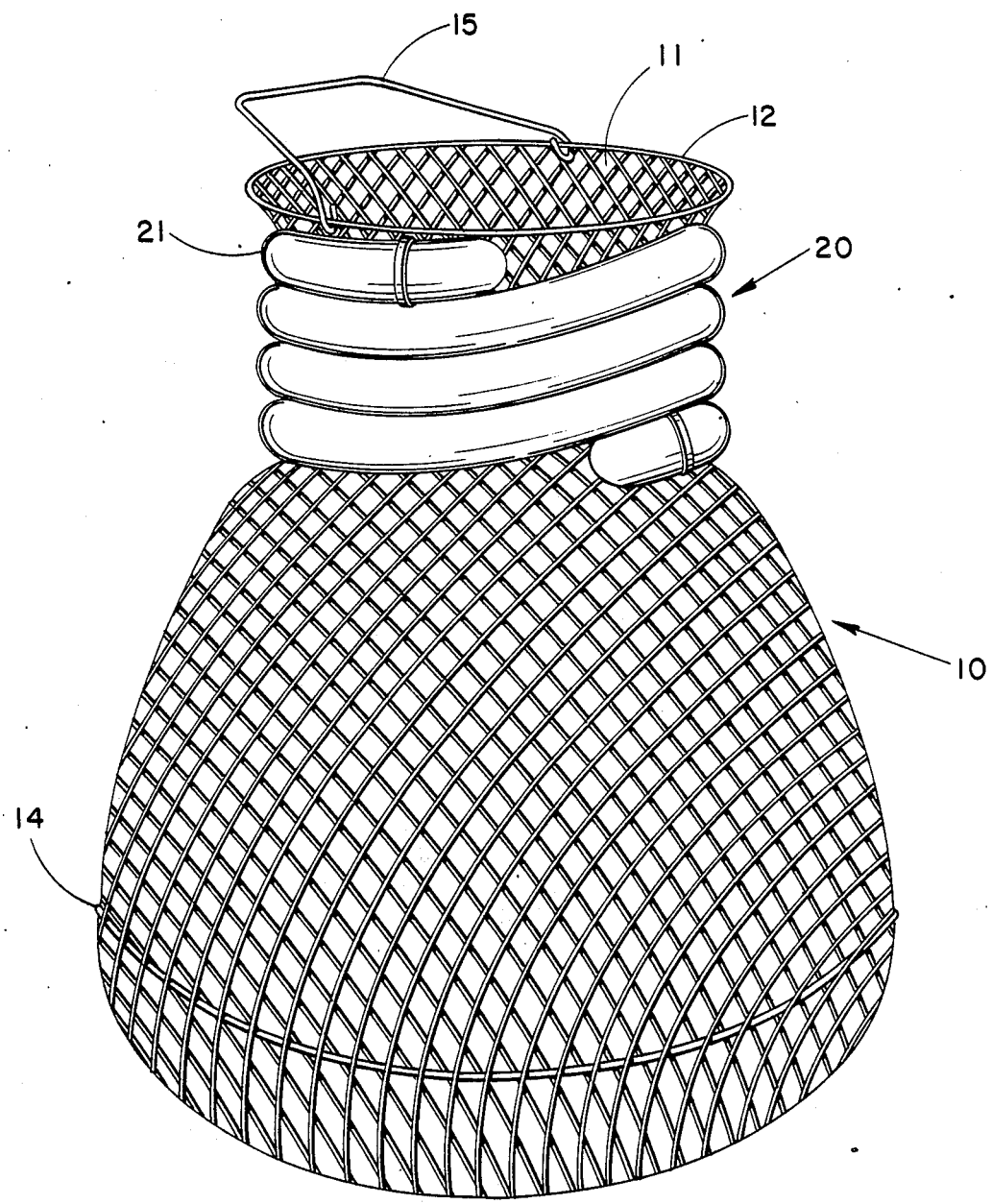
FIG. 1 is an elevational view of a fully extended collapsible fish net or basket incorporating an embodiment of the invention.

A conventional and commercially available fishing net or basket for holding fish in the water after they have been caught is designated by reference numeral 10 and is made of some suitable mesh material. Wire is usually preferred although twine or other fabrics can be used. The basket has an opening or mouth 11 at the top which may be defined by an encircling reinforcing ring or rim 12 preferably made out of stiff wire. Other supporting rings may be provided around the basket below the mouth 11 such as medial, ring 13 (FIG. 4) and ring 14 near the bottom of the basket. When not in use the basket collapses when placed on a supporting surface. In use the basket is generally fully extended as illustrated in FIG. 1 and when the fish are caught, they are placed into the mouth of the basket and kept captive within the confines of the basket while the basket is immersed in water and when lifted out of the water. A bail or handle 15 is generally attached to ring 12 at the top of the basket.

In accordance with the invention, the basket is provided with a buoyant collar generally identified by reference numeral 20. The collar 20 is formed by coiling a ropelike length of tubular, circular in cross-section, buoyant material 21 around the outside of the net starting just below the top or mouth 11 of the net and extending downward any desired distance. Any commercially available buoyant material can be used provided it is flexible enough to be wrapped around the basket and doesn't absorb water at a rate which would cause it to lose its buoyancy. Typically a foamed plastic material which is considerably lighter than water and which has no or a very low water absorption characteristic can be used.

Figure 4:
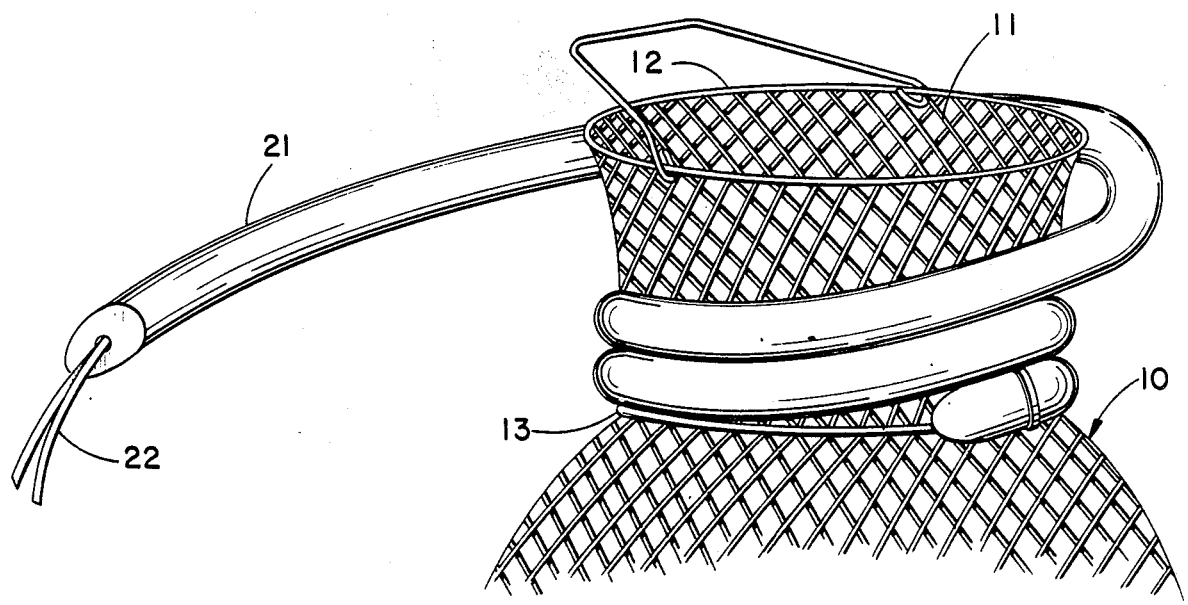
FIG. 4 is a fragmentary view illustrating the manner in which the buoyant material is wrapped around the upper end of the basket and attached to the top of the basket.

To attach the buoyant collar, one end of the ropelike length of the tubular material 21 is attached to the fish basket mesh or to ring 12 and the material is wound around the outside of the fish net to form a coil, as best seen in FIG. 1, and the other end of the tubular material is attached to the fish net or to the intermediate ring 13 (FIG. 4). Alternatively, of course, it can be wound in the opposite direction by first attaching one end to ring 13 and then coiling it around the basket and then attaching the other end near or at the top opening.

Figure 3:
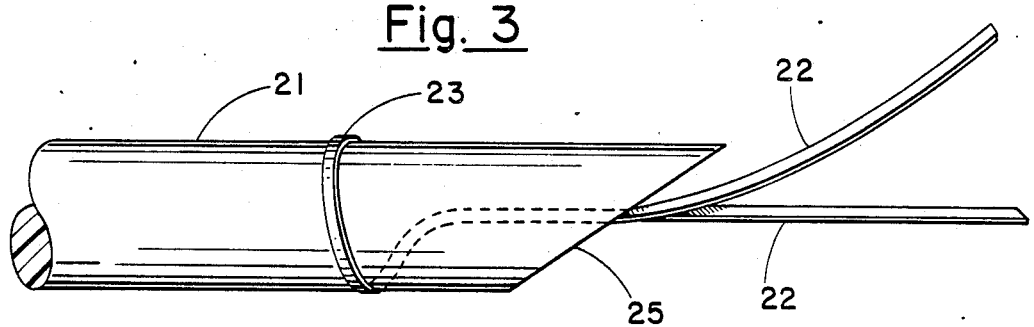
FIG. 3 is a fragmentary view of an embodiment of the invention illustrating a manner of tieing an end of the buoyant material to the basket.

Preferably the means for attaching the buoyant material 21 to the fish net or basket constitutes a twistable wire 22 which is imbedded axially in the tubular material and extends radially outward and is wrapped securely around the outside of the tubular material as shown at 23 in FIG. 3. The two ends of the tie extending axially out from the tubular material can then be easily and conveniently twisted around the mesh of the net or around ring 12 and/or ring 13 to hold the buoyant wrap in place. The ties can be easily untwisted to permit the buoyant material to be detached from the basket. Alternatively, a single twistable wire can be axially lengthwise embedded in the buoyant material and when the rope of buoyant material is cut at the desired length, the material can be stripped back to expose the ends of the wire which can then be used to attach the ends of the coil to the fish basket. If necessary, the tubular material can be attached to the fish basket net at intermediate locations on the coil by using twistable ties wrapped around the outside of the tubular material and twisted around the fishing net mesh.

Preferably the tubular material is brilliantly colored, yellow is preferred, so that if it should float away, it can be quickly spotted.

It can be observed that since the material which forms the floating collar is made from an elongated strip of material, it can be cut to length to accommodate any size fishing basket or net and the collar can be made any desired height or width. In accordance with the invention, conventional and commercially available fishing nets or baskets of various size and shapes can be conveniently provided with a floating collar so that fishermen who already have a collapsible fish net or basket need merely obtain a suitable length of buoyant material and wrap it around and attach it to the fish net as described and as taught by this invention.

Figure 2:
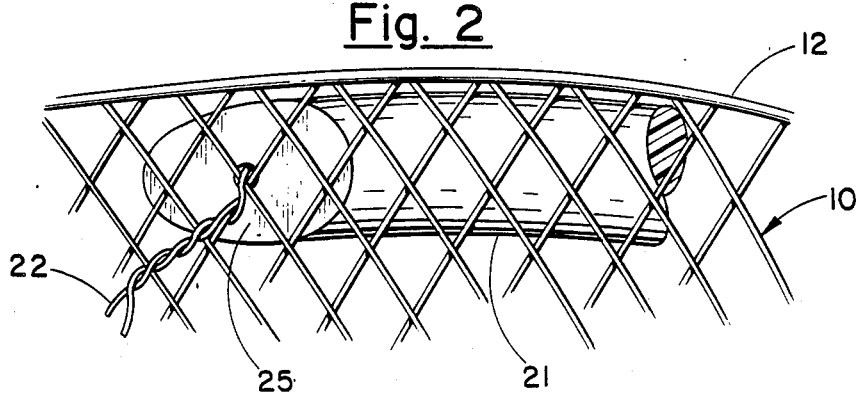
FIG. 2 is a fragmentary view of the top portion of a fish basket showing in detail a manner of attachment of the buoyant material to the basket.

As illustrated best in FIGS. 2 and 3, preferably the ends of the buoyant material are cut at a taper 25 so that they can be drawn up snugly against the basket. This eliminates the possibility of something catching on a protruding edge or corner of the end to pull the coil off or away from the basket.

Figure 5:
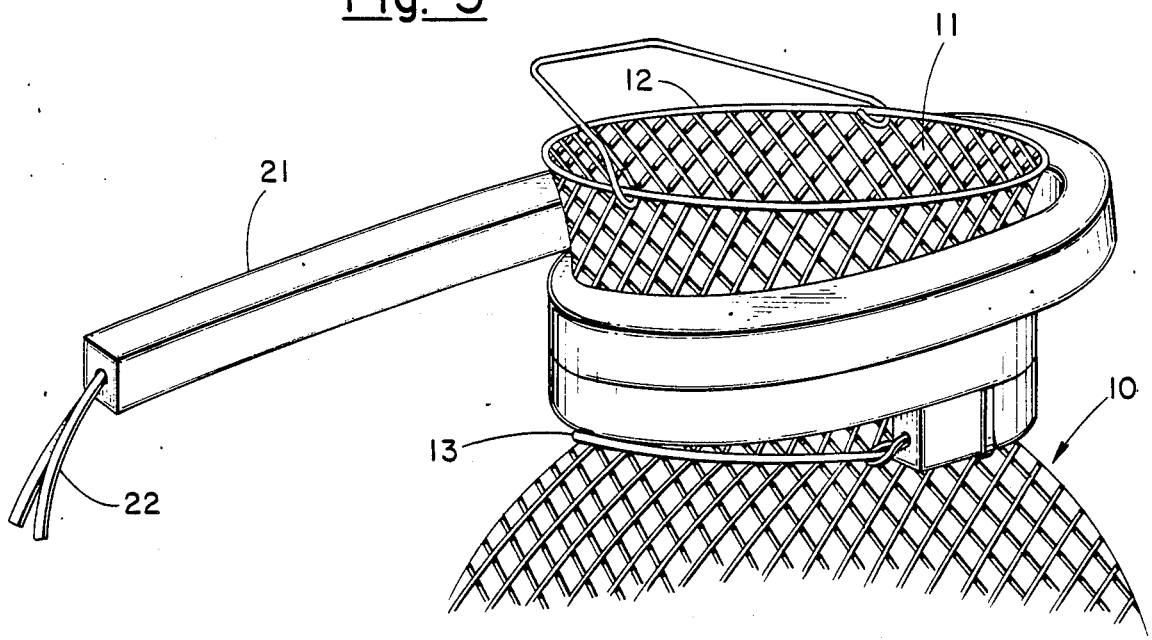
FIG. 5 illustrates another form of the length of buoyant material.

FIGS. 1-4 illustrate using a strip of buoyant material which is tubular or circular in cross-section. Alternatively, as shown in FIG. 5, the strip 21 can be an elongated band, i.e., rectangular in cross-section. Other cross-section shapes can be used for the strip of material provided they can be coiled around the fish net or basket.

Figure 6:
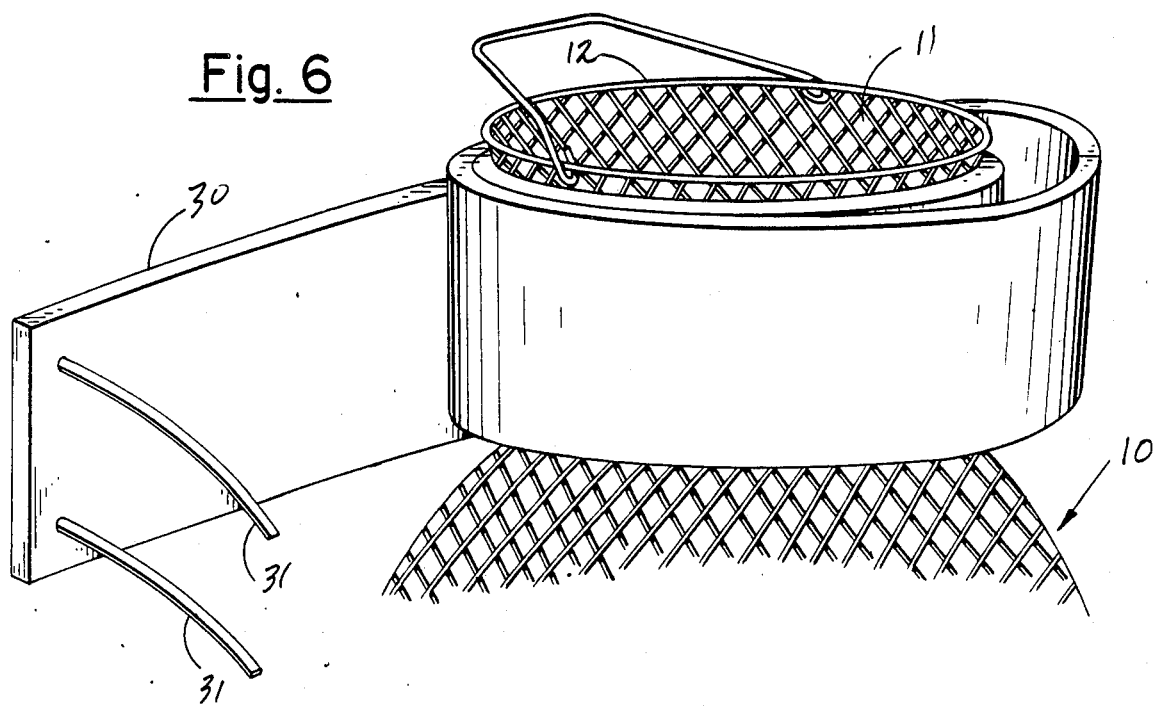
FIG. 6 illustrates another embodiment of the invention.
Figure 7:
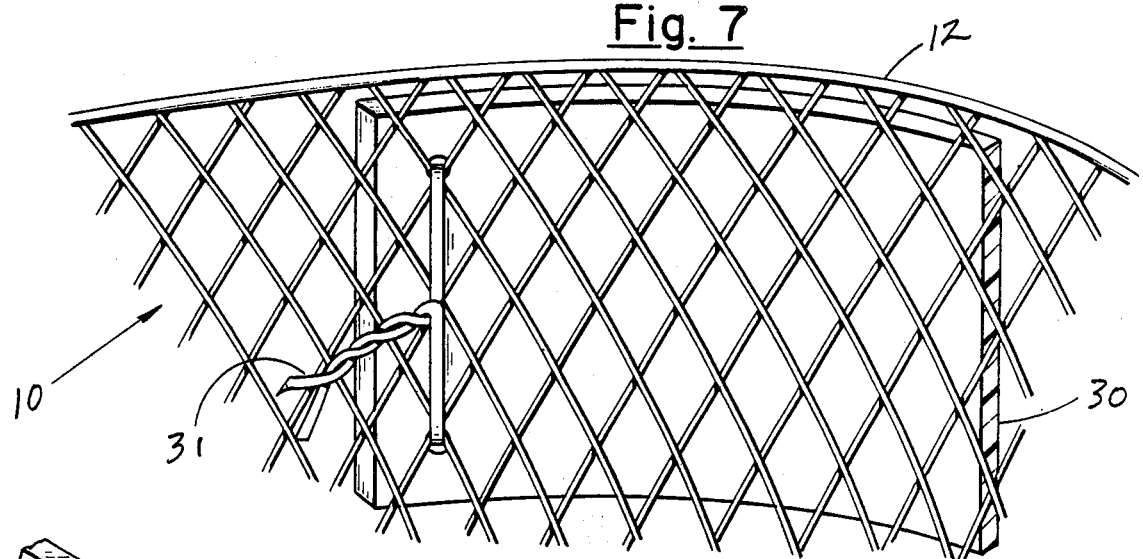
FIG. 7 illustrates a manner in which the embodiment shown in FIG. 6 is attached to the fishing net.
Figure 8:
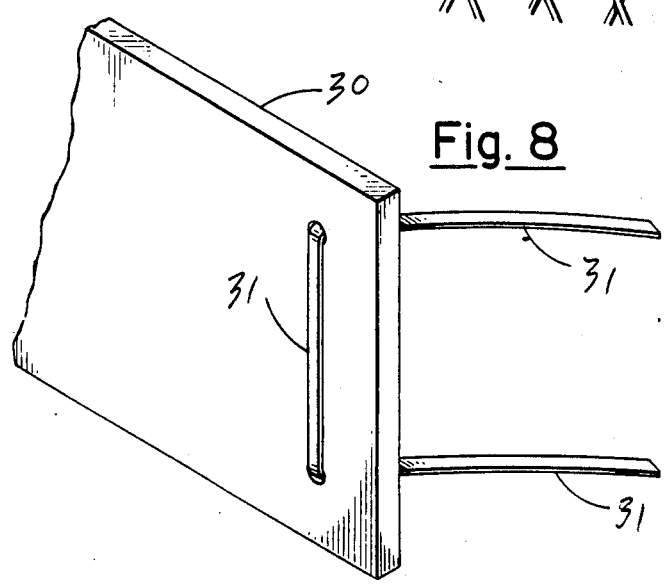
FIG. 8 illustrates a manner of attaching the tie member to the end of the strip shown in the FIG. 6 embodiment.

In the embodiment illustrated in FIG. 6, the strip of buoyant material 30 is significantly wider than that illustrated in the embodiments of FIGS. 1-5 and is wide enough to form a buoyant collar when wrapped around the outside of the fishing basket 10 just below the top opening 11. Preferably the strip of material 30 is coiled to form multiple layers over the outside of the fishing net to provide the necessary buoyancy. A flexible wire-like tie member 31, similar to the tie member illustrated in FIGS. 1-5, is attached at each end of the strip 30 to enable the strip to be attached to the fishing basket 10. At the starting end of strip 30 the tie is wrapped around the mesh of the basket 10 as illustrated in FIG. 7 or can be tied to ring 12 and/or ring 13 (not shown). To attach the other end of the strip 30 to the basket it is necessary to either pierce holes through the inner layers of the wrapped coil or extend the ends of the tie 31 around the outside of the inner layers to reach the basket and/or the rings.

I claim:

1. A floatable live fish net comprising:
   an enclosure made of collapsible mesh material having a closed bottom and open top;
   a length of buoyant material wrapped around the outside of said enclosure to form a multiple winding coil partway between the top and the bottom of said enclosure; and
   means for attaching said coil of buoyant material to said enclosure.

2. The invention as described in claim 10 wherein the ends of the length of tubular buoyant material are tapered to rest snugly against the outside of the enclosure.

3. The invention as described in claim 1 wherein said attaching means includes:
   a length of pliable material extending out from the ends of said length of buoyant material for releasably securing said ends to said enclosure.

4. The invention as described in claim 1 further including:
   a rigid ring around said enclosure located between the top and the bottom, and means for securing one end of said buoyant material to said ring and means for securing the other end of said buoyant material to said enclosure upward from said ring.

5. The invention as described in claim 4 further including a rigid ring around the top opening of said enclosure, the other end of said buoyant material being secured to said top opening ring.

6. The invention as described in claim 1 wherein said buoyant material is tubular.

7. The invention as described in claim 1 wherein sais buoyant material is rectangular in cross-section.

* * * * *